United States Patent
Kragl

[19]

[11] Patent Number: 6,027,671
[45] Date of Patent: Feb. 22, 2000

[54] METHOD FOR PRODUCING A MICROSTRUCTURED BODY, A CASTING FRAME, AND AN INTEGRATED OPTICAL COMPONENT

[75] Inventor: Hans Kragl, Diekholzen, Germany

[73] Assignee: Harting Elktro-Optische Bauteile GmbH & Co. KG, Bad Salzdetfurth, Germany

[21] Appl. No.: 08/948,927

[22] Filed: Oct. 10, 1997

[30] Foreign Application Priority Data

Oct. 12, 1996 [DE] Germany ............ 196 42 088

[51] Int. Cl.[7] .................. B29D 11/00; G02B 6/12
[52] U.S. Cl. ............ 264/1.24; 264/1.25; 385/14; 385/89; 385/92
[58] Field of Search ................. 264/1.24, 1.25, 264/1.36, 1.37, 2.5, 449; 385/14, 131, 89, 92

[56] References Cited

U.S. PATENT DOCUMENTS

| | | |
|---|---|---|
| 4,793,953 | 12/1988 | Maus . |
| 4,797,081 | 1/1989 | Prater . |
| 5,454,055 | 9/1995 | Kragl et al. ............ 264/1.24 |
| 5,475,775 | 12/1995 | Kragl et al. ............ 264/1.24 |
| 5,637,264 | 6/1997 | Knapp et al. ............ 264/2.5 |
| 5,759,453 | 6/1998 | Kato ............ 264/2.5 |
| 5,799,117 | 8/1998 | Kragl et al. ............ 264/1.24 |

FOREIGN PATENT DOCUMENTS

| | | |
|---|---|---|
| 0 471 430 | 2/1992 | European Pat. Off. . |
| 44 34 832 | 4/1996 | Germany . |
| 195 17 087 | 11/1996 | Germany . |
| WO 94/08236 | 4/1994 | WIPO . |

*Primary Examiner*—Mathieu D. Vargot
*Attorney, Agent, or Firm*—Kenyon & Kenyon

[57] ABSTRACT

A method for producing a microstructured body, in which a casting mold including a casting frame and a bottom plate is formed and is filled with a reaction molding compound. After curing, the casting frame is part of the component, while the bottom plate can be reused. Since both the base plate and the frame have been produced by microstructuring technology methods, this method yields a component that has high precision but can nevertheless be produced inexpensively in large numbers.

9 Claims, 10 Drawing Sheets

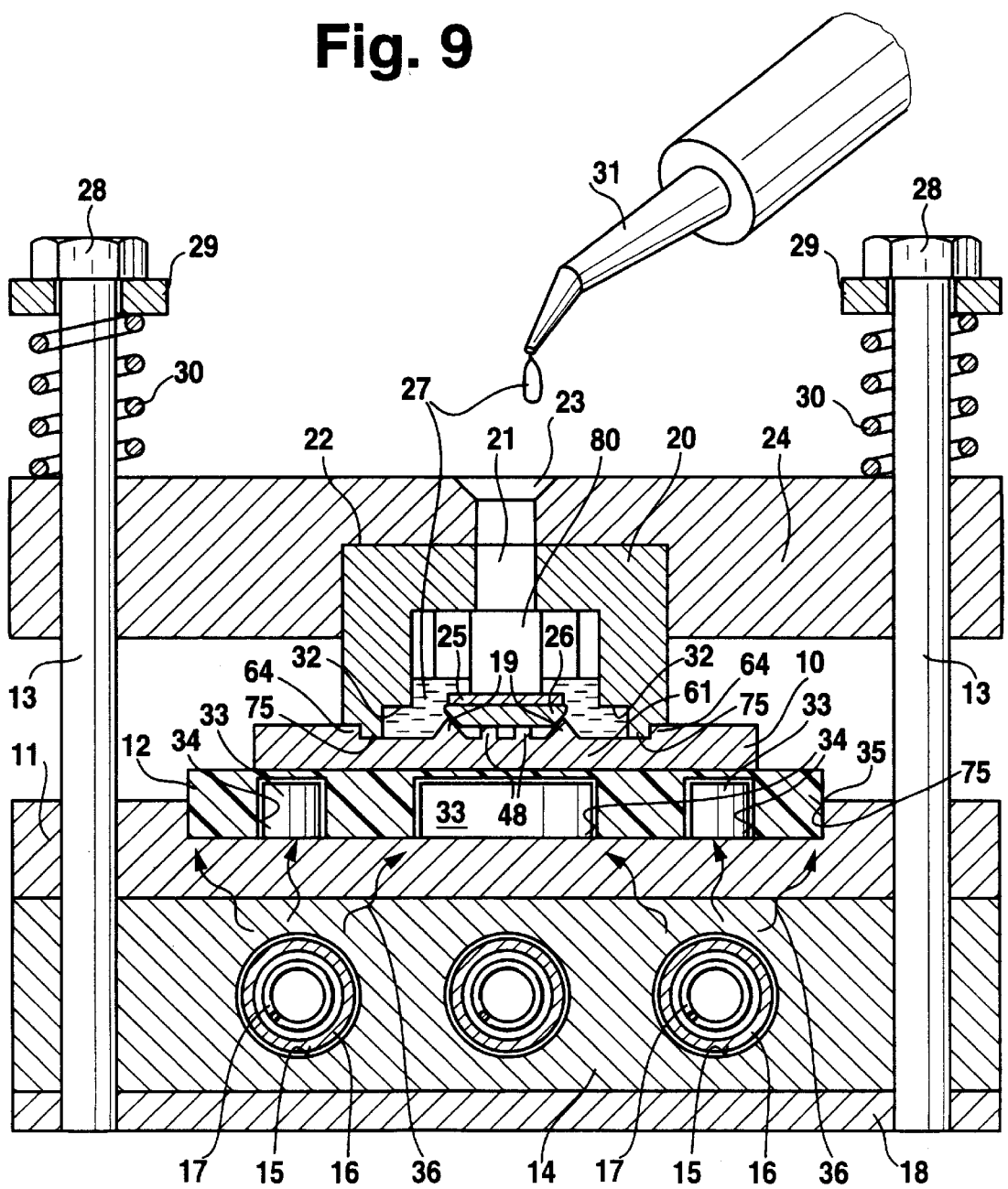

METHOD FOR PRODUCING A MICROSTRUCTURED BODY, A CASTING FRAME, AND AN INTEGRATED OPTICAL COMPONENT

FIELD OF THE INVENTION

The present invention relates to a method for producing a microstructured body, such a microstructured body, a process for producing a casting frame, such a casting frame, a process for producing an integrated optical component, and such an integrated optical component.

BACKGROUND INFORMATION

PCT International No. WO 94/08236 describes a process for producing a microstructured body in the shape of a cover for an integrated optical circuit. In this process, an optical component is inserted into a mold that has adjusting elements. As it is inserted, the optical component is adjusted by means of the adjusting elements on the mold. By casting a curable fluid around the optical component, a cover containing the optical component is produced. The casting process is an injection molding or injection/compression molding process, where the curable fluid is introduced into the desired mold under the influence of pressure and/or temperature and then cured. In this process, the curable fluid has a high viscosity that permits relatively accurate outside dimensions of the resulting optical component but sets limits with regard to moldability.

German Patent No. 44 34 832.0 describes a process for producing a microstructured body as an integrated optical cover component, where a prefabricated trough-shaped container functions as the outside border for the resulting cover component, in that this container is placed on a mold and a reaction molding compound is cast in the container. The container is preferably made of a plastic such as polycarbonate and can be produced as an injection molded part.

German Patent No. 19 517 087.3 describes a casting frame that serves as an outside border for a microstructured body that is to be produced, and when placed on a mold, it locks in place in the mold with at least one locking element. This locking action causes the casting frame to be adjusted on the mold, which offers the advantage in production of the microstructured body that the microstructure of the microstructured body is always located in the same position with respect to the position of the casting frame. The casting frame described there can also be produced by the injection molding method.

SUMMARY OF THE INVENTION

The method according to the present invention for producing a microstructured body and a casting frame has the advantage compared to the background art that a precisely defined outside contour is available for further use of the microstructured body, because methods of microstructuring technology are used to produce both the casting frame and the microstructured body. Because of the low viscosity of many curable fluid compounds, in particular reaction molding compounds, and the good creep strength associated with this, extremely precise impressions can be obtained with a mold that has elevations with an arrangement of cavities of virtually any degree of complexity. Furthermore, the microstructured body produced in this way has a high planarity on the bottom side. In addition, a reaction molding compound used as a curable fluid material is less expensive to develop and use in small-lot production than comparable injection molding compounds. Also, the use of a reaction molding technique has the advantage that no high mechanical forces act on the microstructured body or the fluid compound to be cured in the production process, so there is almost no displacement of the casting frame relative to the second bottom mold plate due to mechanical forces. Likewise, the risk of displacement of insertable electrical, optical or electro-optical components is thus also reduced.

Heating of the second bottom mold plate is advantageous to initiate the reaction process because the curable fluid compound in the form of the reaction molding compound is then heated starting from the mold and the curable fluid compound is polymerized first. This yields an accurate structure precisely where the greatest precision is required.

Heating the second bottom mold plate starting from its bottom side over a large area offers the advantage that it produces an approximately planar temperature profile approximately parallel to the surface of the second bottom mold plate. This produces an extremely homogeneous reaction process is produced at the surface of the second bottom mold plate, which increases the accuracy and planarity of the cover component.

The choice of a ferromagnetic material for the second bottom mold plate and its placement on a support plate, where the first bottom mold plate is held by a magnetic field, have proven to be advantageous because then no additional mechanical holding elements need be provided to secure the first bottom mold plate.

Depressions on the bottom side of the microstructured body can be used to advantage for adjustment in the following method steps. In addition, they can accommodate a polymer adhesive, so that optical waveguides are formed in the depressions.

Adjustment of the contoured frame to produce the casting frame by means of at least one frame adjusting element on the first bottom mold plate has the advantage that an active adjustment, e.g., by optical methods, is not necessary, and a high accuracy in adjustment is guaranteed.

Providing the insert element for production of the casting frame with at least one hole in which at least one support element is formed offers the special advantage that a casting frame with a support element can be produced and can be used for mounting electrical, optical, or electro-optical components. The support element also increases the stability of the casting frame. Applying at least one electrical, optical, or electro-optical component to the support frame makes the microstructured body produced with the help of the casting frame suitable for use in the field of integrated optics, where the support element assumes the function of securing the electrical, optical, or electro-optical component. Providing at least one through notch on the top side of the insert element is an advantageous embodiment because appropriate struts for the casting frame are formed by casting a compound in the notches and they increase its stability.

Producing grooves in the casting frame offers the advantage that the grooves can be used for a variety of applications, for example, as adjusting elements.

Likewise, the functional reliability of the microstructured body to be produced is increased when the risk of a solidified curable, fluid compound slipping toward the bottom of the casting frame is reduced by an auxiliary structure.

It is also especially advantageous to produce the depression in the first bottom mold plate together with an approximately identical depression in the second bottom mold plate that serves as a mold in producing the microstructured body because then the same masks can be used for both depressions. In addition, the precision of the resulting microstructured body is increased in an advantageous manner because the respective process parameters have the same influence on the dimensions of both depressions and then the casting frame can engage in the trough-shaped depression with an especially high accuracy.

BRIEF DESCRIPTION OF THE DRAWINGS

FIG. 4b illustrates a perspective view of the arrangement shown in FIG. 4a.

FIG. 5c illustrates a cut-away side view of the casting frame shown in FIG. 5a.

FIG. 9 illustrates a casting device with a casting frame placed on a mold and with an electro-optical component.

DETAILED DESCRIPTION

Figure 1A:
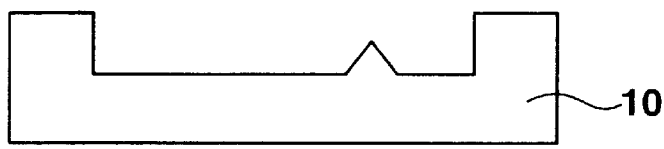
FIG. 1a illustrates a cross section through a second bottom mold plate.

FIGS. 1a through 1d illustrate a method according to the present invention for producing a microstructured body. FIG. 1a shows a cross section through a mold 10 that is also referred to as the second bottom mold plate in the following description. On its surface, the mold has a structuring which is described in greater detail below in the description of the following figures, in particular FIGS. 6, 7 and 8a–8d.

In a second step, a casting frame 20 is placed on mold 10. Mold 10 together with casting frame 20 forms a container that is open at the top, as shown in FIG. 1b.

This container consisting of mold 10 and casting frame 20 is filled with a curable, fluid compound 27 in a subsequent step. After filling, the curable fluid compound 27 hardens. FIG. 1c shows the container after filling.

Curing is followed by unmolding, where the microstructure is released from mold 10. Casting frame 20, which was initially part of the container that is open at the top and was used as the casting mold, has bonded to the curable, fluid compound 27 which has hardened and is now part of microstructured body 100. This microstructured body is shown in FIG. 1d. Especially precise shaping of the bottom side as well as the side surfaces of microstructured body 100 can be achieved by producing both casting frame 20 and mold 10 by the methods of microstructuring technology.

Figure 1B:
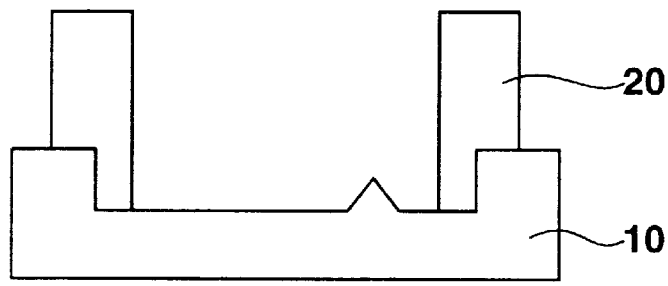
FIG. 1b illustrates a casting frame placed on the second bottom mold plate.
Figure 1C:
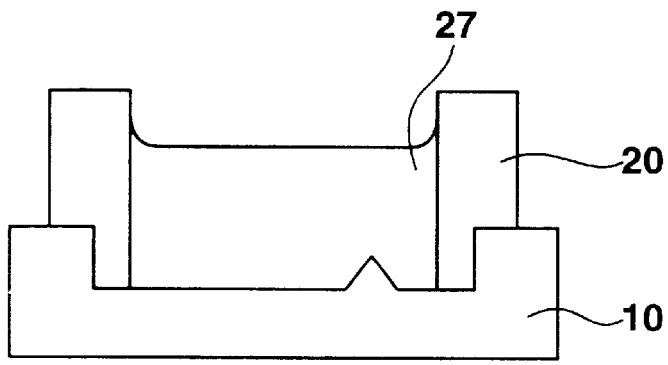
FIG. 1c illustrates a container, including a casting frame and a second bottom mold plate, filled with a curable fluid compound.
Figure 1D:
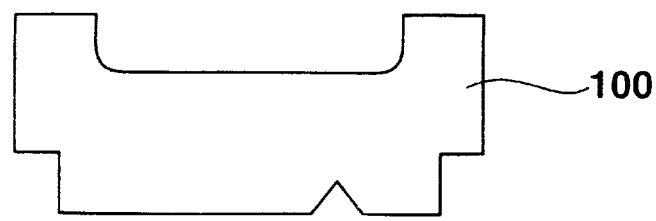
FIG. 1d illustrates a microstructured body including the casting frame and the hardened fluid compound.

Methods of microstructuring technology in the sense used here are methods of processing and shaping materials, where at least one lithography step is provided for shaping, and where lithography can also be performed with X-rays, laser beams, or ultraviolet light The method presented in FIGS. 1a through 1c is explained in greater detail below on the basis of embodiments. The production of casting frame 20 is illustrated here on the basis of FIGS. 2 through 5, and FIGS. 6 through 9 show the production of microstructured body 100.

Figure 2:
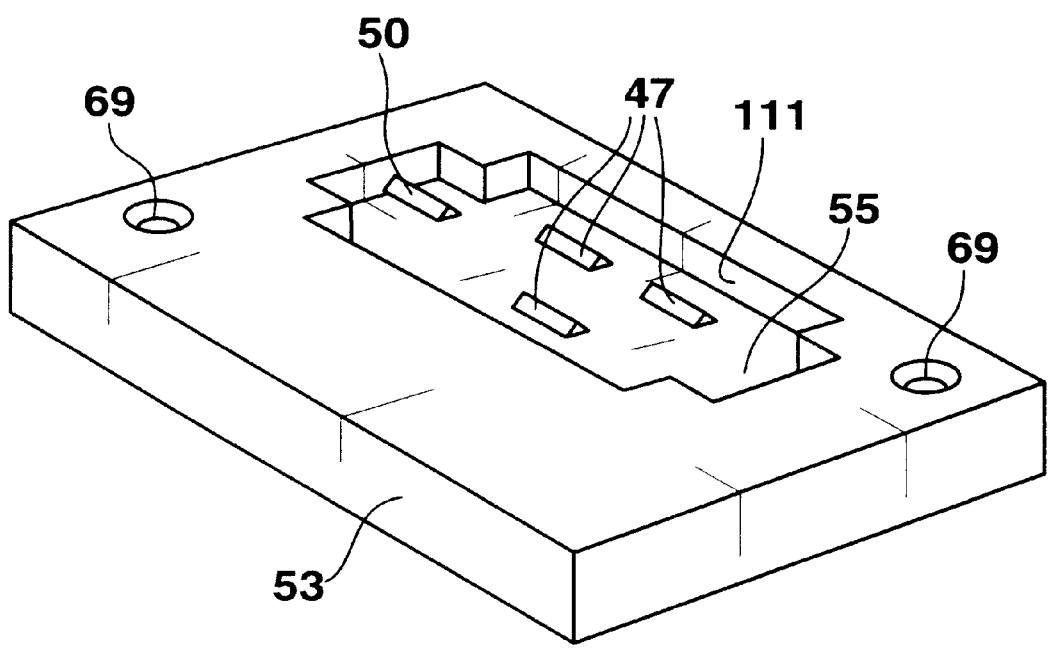
FIG. 2 illustrates a perspective view of a first bottom mold plate.

FIG. 2 illustrates a first bottom mold plate 53 that is used in a process for producing casting frame 20. The first bottom mold plate 53 is designed as a flat, approximately rectangular plate with a depression 55 having a wall 111. It has a rectangular base shape with, adjacent to the narrow end faces, two rectangular side molded pieces which form the narrow sides of depression 55. In addition, a plurality of elevations 47, 50 are arranged in depression 55. Two of these elevations are roof ridge-shaped place-holder elevations 50 which are aligned with each other approximately along the longitudinal axis of depression 55. In addition, three roof ridge-shaped embossed elevations 47 are provided, two of which are aligned in their roof ridge lines, and the third roof ridge-shaped embossed elevation 47 is offset relative to the two other roof ridge-shaped embossed elevations 47 and is arranged approximately in the middle of the interspace between the two other roof ridge-shaped embossed elevations 47. The roof ridge lines of all three embossed elevations 47 run parallel to the roof ridge line of roof ridge-shaped place-holder elevations 50.

The first bottom mold plate 53 also has a frame adjusting element 69 which is designed in the form of a cylindrical depression next to depression 55 in the first bottom mold plate 53. All elevations 47, 50 are shown only as examples. It is equally possible to use different arrangements and shapes.

Figure 3A:
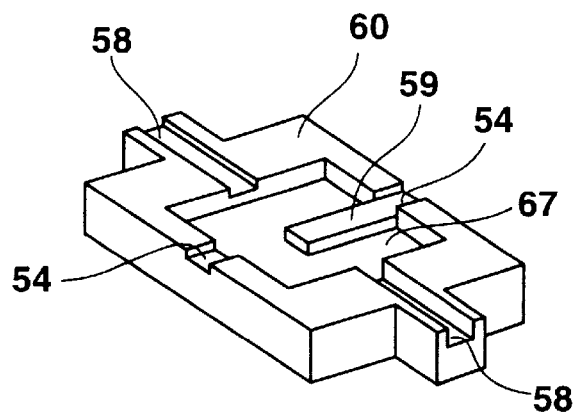
FIG. 3a illustrates a perspective view of an insert element.

To produce casting frame 20, an insert element 60, which is illustrated in FIG. 3a, is needed in addition to the first bottom mold plate 53. Insert element 60 has essentially a rectangular shape, with one longer side and one shorter side. Two extensions with an approximately square shape are attached to the shorter sides. A longitudinal notch 58 which also has a rectangular cross section runs approximately parallel to the longer side at the upper side, and a transverse notch 54 with a rectangular cross section runs approximately parallel to the shorter side of insert element 60 at the upper side. A U-shaped hole 67 is provided in insert element 60 approximately at right angles to the two notches 54, 58 and passes through insert element 60 from the top side to the bottom side. Through said hole, a tongue 59 projects into the interior of insert element 60.

Figure 3B:
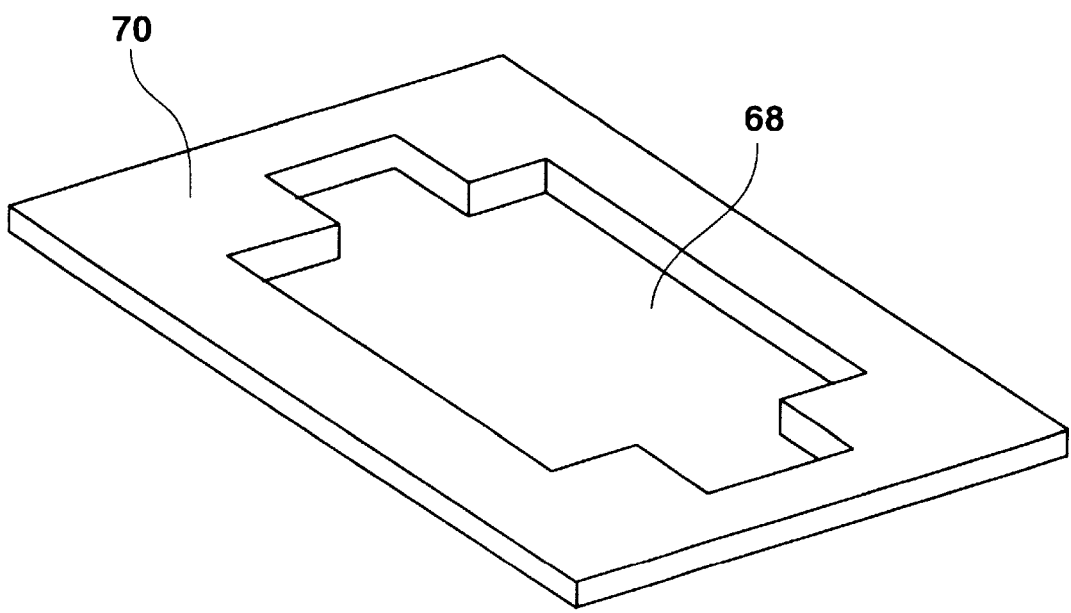
FIG. 3b illustrates a perspective view of a contoured frame.

Furthermore, in addition to the first bottom mold plate 53 and insert element 60, a contoured frame 70, which is illustrated in FIG. 3b, is needed to produce casting frame 20. Contoured frame 70 is designed in the form of a flat disk in which there is an opening 68. Opening 68 here has the same shape as depression 55 in the first bottom mold plate 53. However, the lateral dimensions of opening 68 in this example are selected to be larger than those of depression 55. On the bottom side, contoured frame 70 has two cylindrical locking elevations 99, which are not visible in the perspective view in FIG. 3b. They are the same distance from the axes of opening 68 as frame adjusting element 69 is relative to the axes of depression 55 of the first bottom mold plate 53.

Figure 4A:
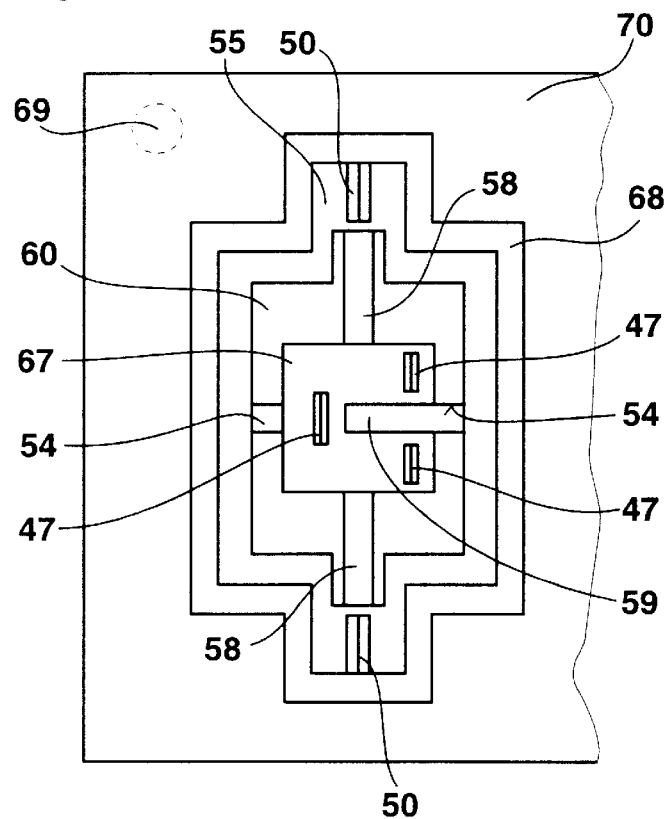
FIG. 4a illustrates a top view of an arrangement with a first bottom mold plate, a contoured frame and an inserted insert element.
Figure 4B:
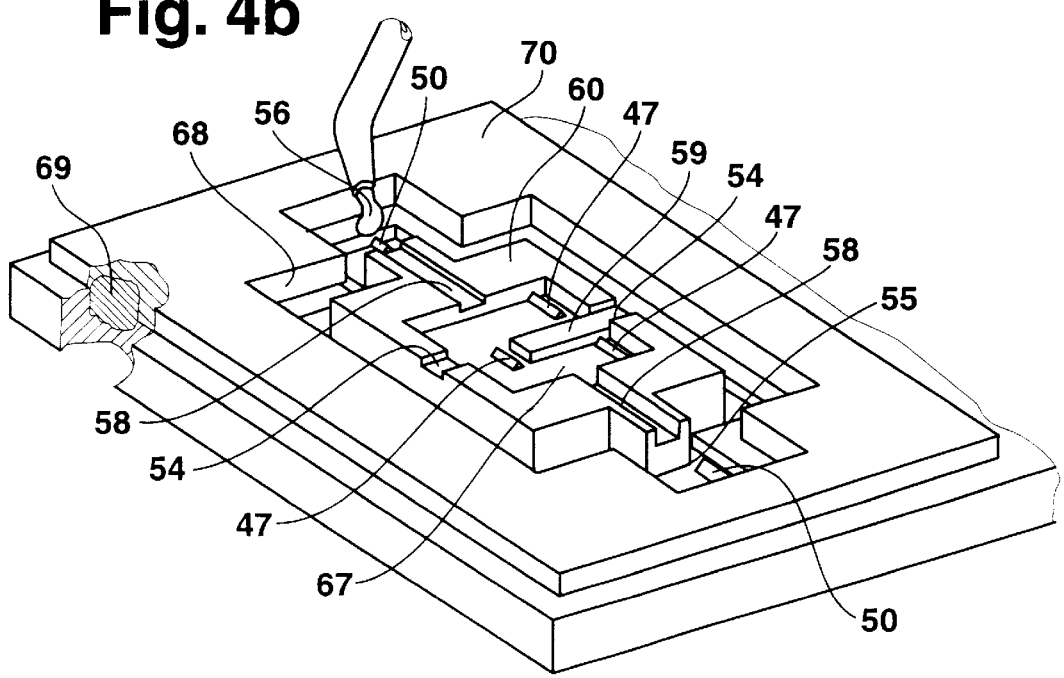

Insert element 60 designed in this way is inserted into depression 55 of the first bottom mold plate 53 and secured by spot welding or screwing, as illustrated in FIGS. 4a and 4b. The numbering from FIGS. 1a through 3 has been retained. In addition to insert element 60, contoured frame 70 is placed on the first bottom mold plate 53 and secured there; as described above and as illustrated in FIG. 3b, it is designed in the form of a flat disk with an opening 68. Opening 68 here has the same shape as depression 55 in the first bottom mold plate 53, but the dimensions of opening 68 are larger than those of depression 55, so that after placing contoured frame 70 on the first bottom mold plate 53, a step running along the inside wall of opening 68 is formed in opening 68. Contoured frame 70 locks in frame adjusting element 69 of the first bottom mold plate 53 by means of lock elevation 99, preferably so that it cannot twist. Insert element 60 has dimensions so that its outside walls come to lie inside depression 55, namely in such a way that a gap running around insert element 60 remains between the outside walls of insert element 60 and the inside wall of depression 55. Tongue 59 of insert element 60 comes to lie between the three roof ridge-shaped embossed elevations 47. Longitudinal notch 58 is aligned approximately with the roof ridge line of roof ridge-shaped place-holder elevations 50.

Figure 5A:
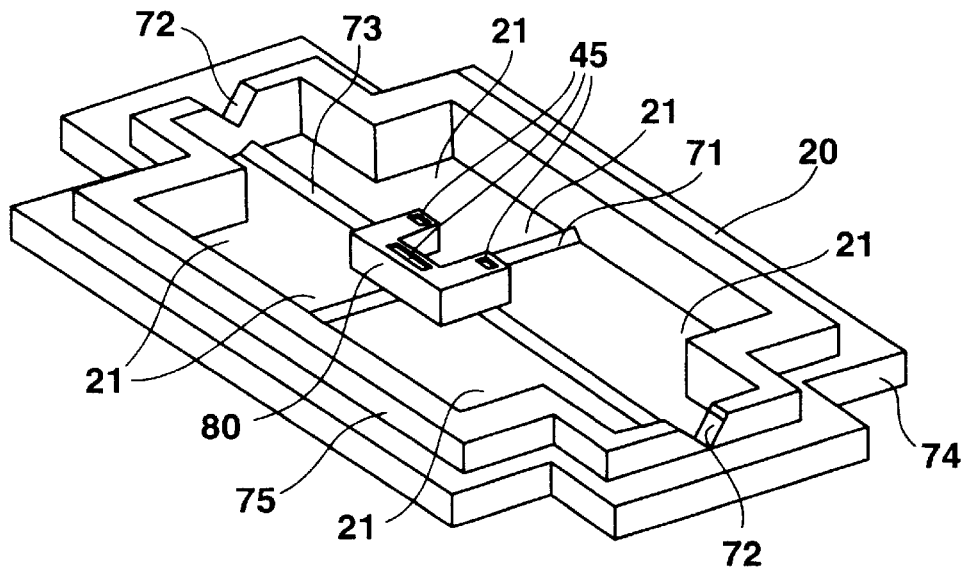
FIG. 5a illustrates a perspective view of a casting frame.
Figure 5B:
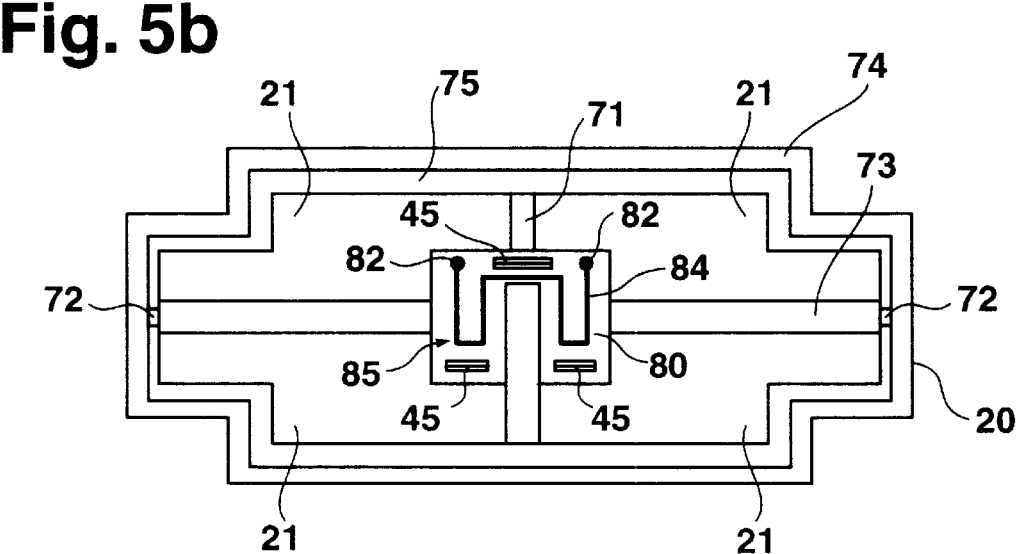
FIG. 5b illustrates a top view of the bottom side of a casting frame with a heating element.
Figure 5C:
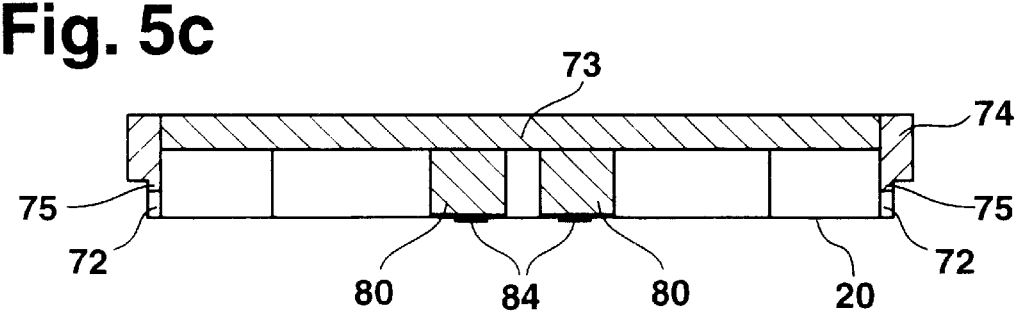

As shown in FIG. 4b, a curable, fluid casting compound 56 is poured into this arrangement and penetrates into all the recesses, in particular also into hole 67. The filling level is selected accurately so that hole 67 and notches 58, 59 are just filled but the surface of insert element 60 is not wetted. This is followed by a curing operation, where the curable fluid casting frame compound 56 solidifies to a solid structure. After unmolding the solidified structure from contoured frame 70, first bottom mold plate 53 and insert element 60, a casting frame 20 is formed as the structure. The resulting casting frame 20 has support element 80, as described above. FIGS. 5a–5c show a casting frame 20 such as that produced by the casting process described in relation to the preceding FIGS. 2–4b. FIG. 5a shows a perspective diagram of casting frame 20. FIG. 5b shows a view from below, i.e., on the side formed by making an impression of depression 55 of the first bottom mold plate 53. FIG. 5c shows a cut-away side view along the dotted line shown in FIG. 5b. In addition, in another step, a conductor structure, which is described in greater detail below, was applied to the casting frame illustrated in FIGS. 5b and 5c.

Casting frame 20 has the shape of an elongated rectangular frame which extends into rectangular side frame pieces on its narrow sides. In this example, the sides of the rectangular side frame pieces running crosswise to the longer sides of the elongated rectangular frame are somewhat shorter than the narrow sides of the elongated rectangular frame.

Other embodiments of the outside contour of casting frame 20 are also possible, however, and are provided for. Casting frame 20 is hollow in its interior, so it has only one wall 74 running along the outside lines of the elongated rectangular frame and the rectangular side frame pieces. Wall 74 has a shoulder that serves as locking element 75 running around the inside edge at the upper side. Locking element 75 has a lip groove 72, which is shaped in the form of an inverted roof ridge-shaped notch, only on the end faces of the rectangular side pieces of casting frame 20. Locking element 75 is also referred to hereinafter as a lip. To improve stability, a longitudinal strut 73 runs inside casting frame 20 along the longitudinal direction of casting frame 20, and two transverse struts 71 run across the longitudinal strut. The intermediate spaces between struts 71, 73 are filling openings 21. A U-shaped support element 80 is provided at one of the two points of intersection between one of the transverse struts 71 and longitudinal strut 73. Support element 80 has an approximately rectangular cross section. The two legs of U-shaped support element 80 are arranged here parallel to struts 71, 73 as an example.

Support element 80 is formed as an impression of hole 67. In the manufacture of the microstructured body, the support element is important because it serves to mount an electrical, optical, or electro-optical component. FIGS. 5b and 5c show views of casting frame 20 where an electro-optical component in the form of a heating element 85 has been applied to support element 80 after casting. For this purpose, heating element 85 has a meandering heating loop 84 with a terminal contact 82 on each end.

It can be seen that support element 80 has been adapted in an advantageous manner to the electrical, optical, or electro-optical component 85 to be applied later in order to minimize consumption of casting frame compound 56 while at the same time ensuring good curing and mold release properties for support element 80. However, the design of support element 80 can be selected freely in principle. In addition, inverted roof ridge-shaped support element grooves 45, which are formed as an impression of the roof ridge-shaped embossed elevations 47, can be seen in support element 80. Inverted roof ridge-shaped lip grooves 72 are also formed as an impression of roof ridge-shaped placeholder elevations 50. Struts 71, 73 are formed from notches 54, 58. Lip 75 is formed on the basis of the difference in size between recess 68 in contoured frame 70 and depression 55.

Casting frame 20, which is thus provided with electro-optical component 85, is used below to produce a microstructured body. Casting frame 20, which has already been described, forms a component of the casting mold required for this purpose.

Figure 6:
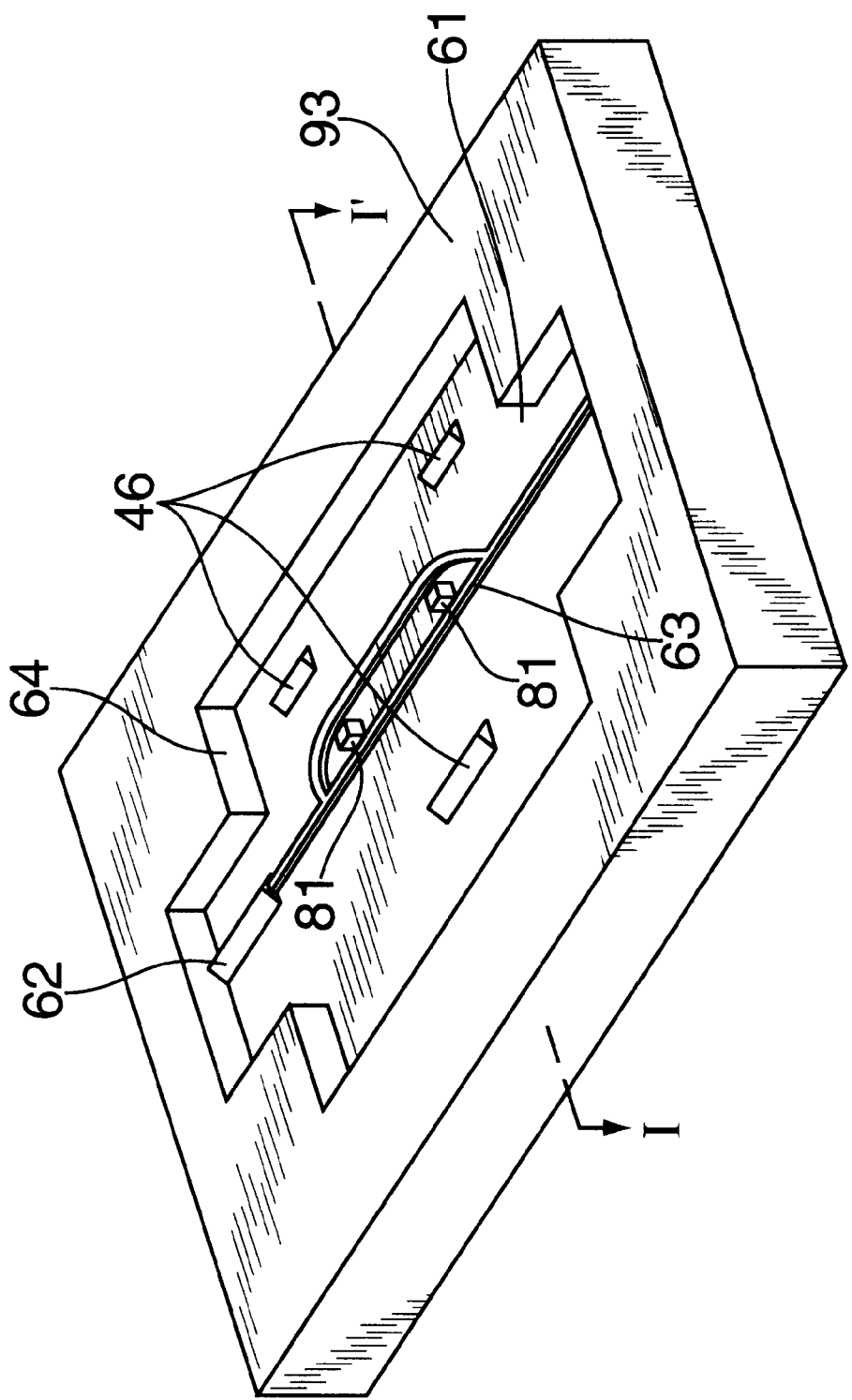
FIG. 6 illustrates a perspective view of the second bottom mold plate.

Another component of the casting mold for production of the microstructured component is shown in FIG. 6. This is a second bottom mold plate 93 that forms a mold 10. The second bottom mold plate 93 has a trough-shaped depression 61 whose outer horizontal projection and lateral dimensions are identical to the outer shape and lateral dimensions of depression 55 of the first bottom mold plate 53. Trough-shaped depression 61 has a wall 64 that serves as a mating locking element. Inside trough-shaped depression 61 there are two roof ridge-shaped fiber adjusting elevations 62 along the longitudinal axis, one at each end of trough-shaped depression 61, although only one can be seen in FIG. 6 because of the perspective view. In addition, there are three roof ridge-shaped frame adjusting elevations 46, two of which are aligned in their roof ridge line, where the roof ridge lines of all three frame adjusting elevations 46 run parallel to the roof ridge line of roof ridge-shaped placeholder elevations 50. The third roof ridge-shaped frame adjusting elevation 46 is offset relative to the two other roof ridge-shaped frame adjusting elevations 46 and is arranged approximately in the middle of the interspace between the two other roof ridge-shaped frame adjusting elevations 46. The three roof ridge-shaped frame adjusting elevations 46 and the two roof ridge-shaped fiber adjusting elevations 62 correspond in position to the three roof ridge-shaped embossed elevations 47 and the two roof ridge-shaped place-holder elevations 50 in depression 55 of the first bottom mold plate. Elevations 62 and 50 have approximately the same dimensions, but elevation 46 must be definitely higher than elevation 47 by the dimension which will subsequently determine the distance between the electrical optical component and the waveguide/upper edge on the finished component.

A rectangular elevation 63 runs between the two roof ridge-shaped fiber adjusting elevations 62. Rectangular elevation 63 consists of a main arm, which forms a linear connection between the two roof ridge-shaped fiber adjusting elevations 62, and a bypass arm, which branches off from the main arm at its connection to roof ridge-shaped fiber adjusting elevation 62, then runs parallel to the main arm between the two aligned roof ridge-shaped frame adjusting elevations 46 on one side and the single roof ridge-shaped frame adjusting elevation 46 on the other side and then combines again with the main arm at the connection of the main arm to the other roof ridge-shaped fiber adjusting elevation 62. One cube-shaped elevation 81 is also provided on the left and another on the right of the single frame adjusting elevation 46 in the extension of the roof ridge line. For reasons yet to be disclosed, the second bottom mold plate 93 does not have a frame adjusting element 69, in contrast with the first bottom mold plate 53. In addition, the diagram in FIG. 6 shows a line AA' which serves as a section line for the sectional diagram in FIG. 7.

Casting frame 20 is then placed on mold 10 so that the two parts combine to form a casting mold. This is illustrated, for example, in the cross-sectional diagram in FIG. 7, where casting frame 20, as illustrated in FIGS. 5a and 5b, has been placed on the second bottom mold plate 93 shown in FIG. 6. The arrangement has been cut away along a plane which is perpendicular to the main arm of rectangular elevation 63 and includes line AA' from FIG. 6.

Casting frame 20 is placed on mold 10 with lip 75 facing down, with lip 75 engaging inside the mating locking element 64 with a seal. When casting frame 20 is placed on trough-shaped depression 61, inverted roof ridge-shaped support element grooves 45 engage with the roof ridge-shaped frame adjusting elevations 46, resulting in highly accurate adjustment of support element 80 and an electrical, optical, or electro-optical component placed on it with regard to trough-shaped depression 61. In the embodiment illustrated here, support element 80 is secured in such a way that heating loop 84 mounted on it comes to lie over the main arm of rectangular elevation 63 but not over the bypass arm. Transverse strut 71 and longitudinal struts 73 of casting frame 20 support the sealing effect between lip 75 and mating locking element 64 by preventing casting frame 20 from buckling.

It is possible for casting frame 10 to bend slightly in the outer area when pressure is applied to it, so that lip 75 engages somewhat deeper in mating locking element 64.

Figure 7:
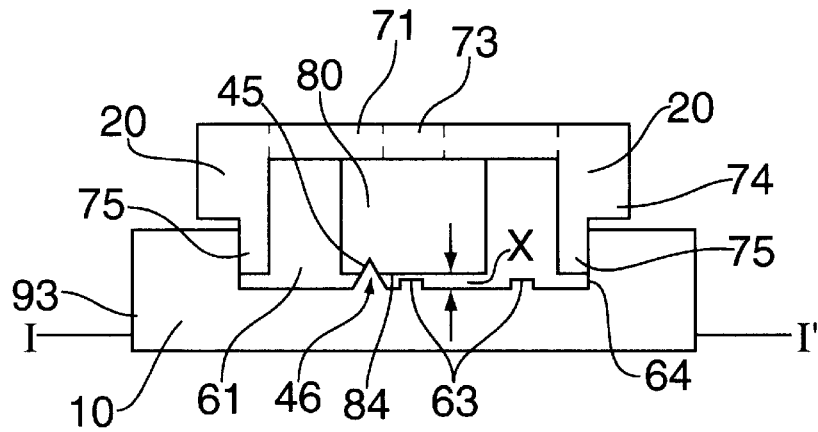
FIG. 7 illustrates a cut-away side view of a casting frame inserted into the mold.

The device illustrated in FIG. 7 is a casting mold for producing a microstructured body. For casting, as described in greater detail in conjunction with FIG. 9a, a curable fluid, preferably a reaction molding compound, is poured into the interior of this casting mold and cured there. After curing and unmolding from mold 10, this yields a microstructured body whose bottom side is a negative impression of the surface in trough-shaped depression 61 of mold 10 and which now contains the previous casting frame 20 as an integral component.

It is expedient at this point, before describing the production of the microstructured body, to describe a method of producing the first bottom mold plate 53 and second bottom mold plate 93. This will be done with reference to FIGS. 8a–d.

Figure 8A:
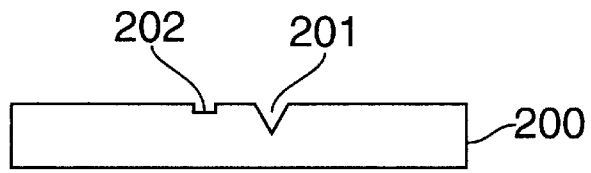
FIG. 8a illustrates an original microstructure used for producing the first and second bottom mold plates.

It is expedient to produce an original microstructure, which is also referred to below as the master, from a single-crystal silicon substrate 200. However, other materials are also possible. Roof ridge-shaped structures 201 may be created by anisotropic etching, for example, and structures with walls 202 approximately perpendicular to the substrate surface can be created by ionic etching, for example. FIG. 8a shows an example of such a structure.

Figure 8B:
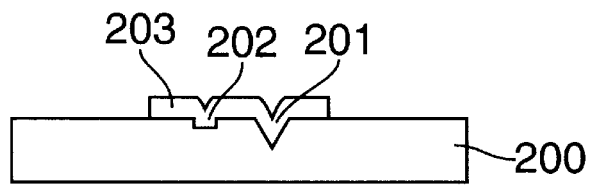
FIG. 8b illustrates the original microstructure covered with a protective layer.

In FIG. 8b, the structure from FIG. 8a has been covered with a protective layer 203.

Figure 8C:
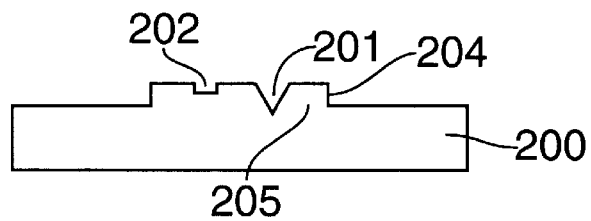
FIG. 8c illustrates a master structure.

The arrangement from FIG. 8b is etched again, so that after removal of the protective layer, the protected part is elevated and has a mesa wall 204, as shown in FIG. 8c. The structure shown in FIG. 8c is the master structure.

Figure 8D:
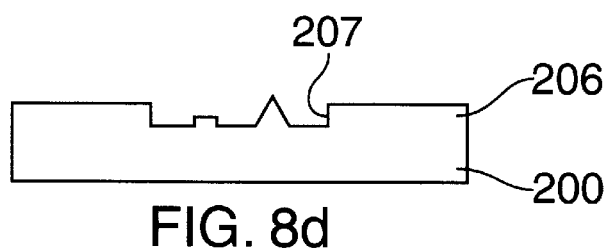
FIG. 8d illustrates a negative impression of the master structure.

By making a second casting of master 205, the first negative impression 206 of the master is obtained, as shown in FIG. 8d. In particular, an impression wall 207 is formed as the second casting of mesa wall 204. However, the master structure is usually lost in taking the second casting. The first negative impression 206 can be reproduced, however, by making second castings of the first negative impression 206 twice.

In producing the first bottom mold plate 53 and the second bottom mold plate 93 by this method, it is important in particular to be sure that depression 55 and trough-shaped depression 61 are as identical as possible in their lateral dimensions. This is guaranteed, for example, if the two master structures have been produced with identical masks for both depressions 55, 61, if possible, by a common photolithographic method, or if at least the masks for the two depressions have been produced in the same step. This measure guarantees that casting frame 20 and mold 10 can be joined in a form-fitting manner laterally to form a casting mold. The lithography step makes the process described here a method of microstructuring technology in the sense of the definition given above.

An especially simple method of joining the casting frame 20 and the second bottom mold plate 93 results when measures are taken in production of the masks, so that the position of the roof ridge lines of roof ridge-shaped embossed elevations 47 in the first bottom mold plate and the position of the roof ridge lines of roof ridge-shaped frame adjusting elevations 46 in the second bottom mold plate match with an extremely high precision, as well as for the corresponding roof angles. If the height of roof ridge-shaped embossed elevations 47 in the first bottom mold plate is slightly smaller than that of roof ridge-shaped frame adjusting elevations 46 in the second bottom mold plate, there results a vertical distance between the electrical or optical element and the surface which is accurately defined with a tolerance of <1 $\mu$m, i.e., a distance from the optical waveguide, of the body to be structured. In the embodiment illustrated here, the difference in height should be at least a few micrometers greater than the height of the rectangular elevations 48. Mesa walls 204 of the master specimens for the first and second bottom mold plates are then preferably selected so they are identical.

This achieves the result that when casting frame 20 is placed on the second bottom mold plate 93, the former is first fixed laterally with locking element 75 in trough-shaped depression 61 in the second bottom mold plate 93. Then with further lowering of casting frame 20, the inverted roof ridge-shaped support element grooves 45 sit in a form-fitting manner on roof ridge-shaped frame adjusting elevations 46 in the second bottom mold plate before the other parts of casting frame 20 come in contact with the bottom of trough-shaped depression 61 of the second bottom mold plate 93. This yields the result that the lateral and vertical positioning of support element 80 with the component that may be attached to it is automatically very accurate relative to rectangular elevations 48. In addition, enough free bottom remains below casting frame 20 for the rectangular elevations. At this point, reference is made to the description of FIG. 7 for illustration purposes.

The easiest way to determine the etching depth for V-shaped grooves is with inverted roof ridge-shaped depressions produced by anisotropic etching because the depth determination here can be based on the determination of a lateral dimension. Those skilled in the art will also know of other methods of producing the first and second bottom mold plates using the process steps described with reference to FIGS. 8a–8d.

The method for producing the microstructured body is described below on the example of an integrated optical cover component. A casting mold is used here with a mold 10, which is formed by the second bottom mold plate 93, and a casting frame 20, which resembles the casting mold described in FIG. 7, for example, as well as a casting device such as that illustrated in FIG. 9 and described below. In this example, casting frame 20 which is used has an upper bottom which has only a single filling opening 21.

FIG. 9 shows a flat bottom plate 18 which has two guide rods 13 that are aligned approximately parallel to each other and vertically to bottom plate 18. In addition, there is a flat base plate 14 which has two holes through which guide rods 13 of bottom plate 18 project. The bottom side of base plate 14 is flush with the top side of bottom plate 18. In addition, there is a flat backing plate 11 that also has two holes through which guide rods 13 project. The bottom side of backing plate 11 rests on the top side of base plate 14. Approximately parallel to its flat top side, base plate 14 has several cylindrical recesses 15 side by side, a bushing 16 with a wire coil 17 arranged in it being provided in each cylindrical recess 15. When electric current flows through wire coils 17, the coils emit thermal radiation 36. In the area between two guide rods 13, backing plate 11 has on its top side an approximately circular depression 35 into which a flat, approximately disk-shaped support plate 12 can be inserted. Support plate 12 approximately fits in depression 35, with several blind holes 34 being arranged in support plate 12 with their openings pointing downward toward backing plate 11. There is a plurality of permanent magnets 33 in blind holes 34. A flat mold 10 is arranged on the top side of support plate 12 and has several roof ridge-shaped elevations 19 on its top side and also has several rectangular elevations 48. An electro-optical component 26 is supported on rectangular elevations 48 with its outer sides in contact with roof ridge-shaped elevations 19. There is also casting frame 20 whose open side faces down toward mold 10. Casting frame 20 with its border formed by the end faces of its side walls rests on mold 10 and is locked in mating locking element 64 of mold 10 with locking element 75 so that mold 10 forms a bottom for the interior of casting frame 20. Support element 80 projects from the top side of casting frame 20 to the bottom side of the casting frame. The mechanical pressure of the bottom side of the casting frame must be great. The interior of casting frame 20 above the surface of mold 10 is filled at least partially with a curable fluid compound 27. A reaction molding compound, for example, may be used as curable fluid compound 27. Reaction molding compound 27 then surrounds electro-optical component 26. Casting frame 20 is partially held in a mounting recess 22 in a flat cover plate 24. In its bottom which is at the top, casting frame 20 has filling opening 21 which is flush with a recess 23 that is provided in cover plate 24.

Cover plate 24 is likewise guided over guide rods 13 by means of two boreholes through which guide rods 13 project and it is pressed downward over two spiral springs 30 that are arranged around guide rods 13. Spiral springs 30 each rest at the upper end against a stop plate 29 which is secured on guide rod 13 with a pressure screw 28. In addition, a pipette 31 is provided for introducing reaction molding compound 27 into casting frame 20 through recess 23 and filling opening 21. In its interior, casting frame 20 also has an auxiliary structure 32 in the form of a shoulder running around the side walls on the inside close to the edge.

Casting frame 20 with support element 80 and electro-optical component 26 is first inserted into cover plate 24 so that its bottom comes to lie in mounting recess 22. Mounting recess 22 is preferably designed so that there is a slight clamping effect on casting frame 20. Casting frame 20 is preferably made of a plastic, such as polyamide (PA) or polyoxymethylene (POM), which need not necessarily be optically transparent. POM and PA are especially suitable because they yield a high degree of planarity of the molded surface and a relative mobility between casting frame 20 and the solidified reaction molding compound 27 due to the negative surface tension with respect to the reaction molding compound e.g., MMA. In addition, the arrangement described here is first finished to the extent that bottom plate 18, base plate 14 and backing plate 11 are arranged one above the other. Likewise, support plate 12 with permanent magnets 33 inserted into blind holes 34 is itself inserted into depression 35 in backing plate 11.

Mold 10 is placed on support plate 12. Mold 10 is secured in position by permanent magnets 33. Mold 10 is aligned so that it assumes a defined position with respect to casting frame 20 which is to be positioned later. Then cover plate 24 with casting frame 20 inserted is placed on the arrangement with the opening in casting frame 20 facing down, with guide rods 13 assuming the function of approximate mechanical guidance of cover plate 24. When they come together, locking element 75 and mating locking element 64 ensure the adjustment between mold 10 and casting frame 20. This may also be accomplished with a slight lateral movement or by jiggling until the parts are engaged and may also be detected. When casting frame 20 is PCT in place, electro-optical component 26 is positioned between roof ridge-shaped elevations 19 and rectangular elevations 48, resulting in an automatic passive precision adjustment of electro-optical component 26 with regard to mold 10. By attaching spiral springs 30 together with stop plates 29 and pressure screws 28, cover plate 24 with trough-shaped container 20 is pressed onto the surface of mold 10 in the locking position. Then fluid reaction molding compound 27 is poured into the interior of casting frame 20 through recess 23 and filling opening 21 by means of pipette 31. When fluid reaction molding compound 27 is poured into casting frame 20, all accessible spaces inside casting frame 20 are filled by reaction molding compound 27. Reaction molding compound 27 preferably has a low viscosity for this purpose. It is not necessary to fill casting frame 20 entirely with reaction molding compound 27.

This arrangement is then heated from beneath by sending electric current through wire coils 17. This causes heating of bushings 16 and then also the entire base plate 14. Thermal radiation 36 thus travels from beneath through base plate 14, backing plate 11, support plate 12 and mold 10 to the top side of the mold. Wire coils 17 are preferably distributed uniformly in base plate 14 to result in an approximately even thermal radiation 36 from the bottom to the top in the direction of mold 10. Fluid reaction molding compound 27 consists, for example, of a polymerizable monomer which is mixed with thermal initiators. With an increase in temperature, the thermal initiators induce polymerization of reaction molding compound 27 above a certain threshold temperature. Since thermal radiation 36 reaches mold 10 from the bottom, polymerization begins first at the surface of reaction molding compound 27 closest to the surface of mold 10.

The composition of reaction molding compound 27 is preferably such that it contains thermal initiators with at least two different temperature thresholds. Heating of the arrangement up to the first temperature threshold is then sufficient to induce at least partial polymerization of reaction molding compound 27. The residual monomer remaining after this can be eliminated by heating to the second threshold temperature in a separate heating oven independently of the arrangement shown here. For use in the field of integrated optical applications, it is advisable to select a reaction molding compound 27 that is optically transparent at least in the range around the optical wavelengths to be used, to permit low-loss guidance of the optical signals.

Likewise, any equivalent method of applying pressure (hydraulic, pneumatic, etc.) can be used to press casting frame 20 against mold 10. Heating may also be accomplished in any other way (combustion, induction, etc.). Instead of guide rods 13, other guidance or positioning devices or methods can also be used. After curing reaction molding compound 27, the arrangement is unmolded again by removing the resulting integrated optical cover component consisting of casting frame 20 together with solidified reaction molding compound 27 and electro-optical component 26 embedded in it from mold 10 and from mounting recess 22.

A particular feature provided is to heat reaction molding compound 27 from casting frame by inserting one or more electrical or electro-optical components 26, 85, 87 for this purpose. For this purpose, electrical or electro-optical components 26, 85, 87 should also be designed so that heat is evolved by passing electricity through it, for example. In particular, heating element 85 which is shown in FIG. 5*a* is suitable for this purpose. Suitable lead wires, e.g., wires leading from the top side of casting frame 20, i.e., through filling openings 21 and/or support element 80 or the like, may also serve to bring current to heating element 85. Such heating elements 85 may also be provided in greater numbers. It is also possible for the same heating element 85 that was used for heating reaction molding compound 27 to also have a function that need not necessarily also be a heating function in the resulting microstructured body, just as it is also possible to provide heating elements 85 that no longer have any function at all after the microstructured body is finished and therefore can be considered lost structures.

Figure 10A:
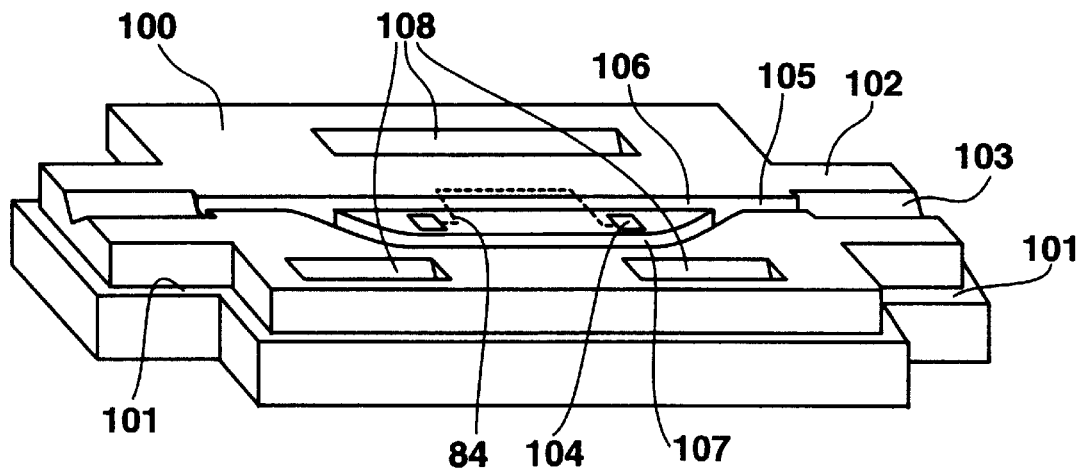
FIG. 10a illustrates a perspective view of a microstructured body.

FIG. 10*a* shows a microstructured body 100 produced using the casting device illustrated in FIG. 9 and the casting mold consisting of casting frame 20 and mold 10 as illustrated in FIG. 7.

This is a perspective view of the bottom side, i.e., the side having the impression of depression 61 of the second bottom mold plate 93. However, the perspective view was not maintained strictly; a few elements in the interior of the microstructured body are shown with dashed lines.

The basic shape of microstructured body 100 is that of a rectangle with smaller rectangles attached centrally to the shorter sides. A step 101 running around the outer edge originates from the step in the former casting frame 20. The part of step 101 that is offset slightly toward the inside is the former sealing lip 64 of casting frame 20. On the surface facing the observer, there are three roof-shaped depressions 108 which represent negative impressions of roof ridge-shaped frame adjusting elevations 46 in the second bottom mold plate 93. The impressions of cube-shaped elevations 81 in the second bottom mold plate 93 are cube-shaped depressions that form contact guides 104. Through the contact guides, it is possible to reach two sections of heating loop 84 that are in the interior of the microstructured body (but are nevertheless shown with dashed lines in FIG. 9) and optionally also establish electric contact with them. Two fiber guides 103 that are designed as roof-shaped depressions are provided along the longitudinal axis of microstructured body 100. They are the negative impressions of the previous roof ridge-shaped fiber adjusting elevations 62 in the second bottom mold plate 93. Fiber guides 103 are connected through a waveguide groove 105. Waveguide groove 105 consists of a main waveguide groove 106, which forms a linear connection between the two fiber guides 103, and a waveguide bypass groove 107, which branches off from main waveguide groove 106 at its connection to one roof ridge-shaped fiber guide 103, runs parallel to main waveguide groove 106 between the two aligned roof ridge-shaped frame adjusting elevations 46 on the one side and the two contact guides 104 on the other side, and joins again with main waveguide groove 106 at the connection of the main arm with the other roof ridge-shaped fiber guide 103.

Microstructured body 100 can now be completed to form an integrated optical component by filling grooves 105, 106, 107 with an optically transparent curable compound. It should be pointed out here that the refractive index of the material for filling the grooves must be higher than that of curable fluid compound 27. Several methods are known for introducing and sealing the optically transparent curable compound in grooves 105, 106, 107. It is also possible to produce a cover as a second microstructured component by the method described above.

Figure 10B:
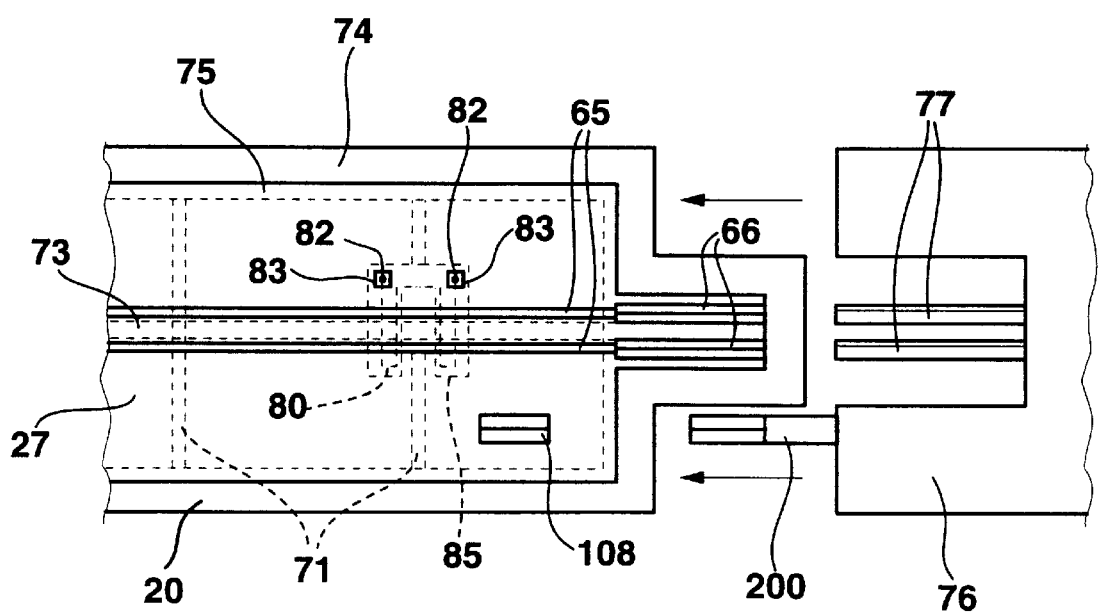
FIG. 10b illustrates a top view of the bottom side of a microstructured body.

FIG. 10*b* shows another integrated optical component produced by the method described above. Here again, the numbering from FIGS. 1*a* through 9 has been retained. This shows as an example how a plurality of depressions 65, 66 are formed in the bottom side of the microstructured body, shown facing the observer in the figure. Of these, two depressions 66 on the narrow side of the microstructured body are formed as impressions of roof ridge-shaped elevations 62 and thus have an inverted roof ridge-shaped cross section. However, two other depressions 65 are formed as impressions of rectangular elevation 63 and thus have a rectangular cross section. In addition, there is a roof ridge-shaped depression 108, which was used for positioning support element 80 and was not filled after finishing the microstructured body. In this example, two rectangular depressions 65 and a total of five inverted roof ridge-shaped depressions 66 were produced with a different mold than in the diagrams in FIG. 6. In general, the number of elevations 62, 63, 81, 108 and the form in which they are arranged on mold 10 can be chosen freely. Support element 80 with heating element 85, which is adjacent to rectangular depressions 65, is embedded in solidified reaction molding compound 27. At those locations where cube-shaped elevations 81 were located, cube-shaped recesses 83 have been formed in the microstructured body through which recesses terminal contacts 82 are visible. Thus, terminal contacts 82 are accessible for electric contacting.

In addition, FIG. 10b also shows a plug element 76 which has the inverted shape of the end face of the microstructured body. This makes it possible to push plug element 76 onto the microstructured body in the direction of the arrow. An especially accurate and tight fit is preferably selected for plug element 76 and the corresponding part of the microstructured body. In particular, plug element 76 is provided with a roof-shaped tongue that engages in roof-shaped depression 108 on the integrated optical component and thus guarantees a tight fit and securing effect Likewise, it is preferable if the outside contour of the microstructured body is manufactured with an especially high precision in relation to the position of depressions 65, 66. This guarantees that in the plugging operation, light guide fibers 77 which are mounted in plug element 76 will be positioned with a high precision over inverted roof ridge-shaped depressions 66, where they will then ultimately be adjusted automatically through these depressions 66 with a high precision. When connecting with light guide fibers 77, it is advantageous to first push plug element 76 onto the microstructured body in the direction of the arrow, with light guide fibers 77 being at a predetermined distance from the surface of the microstructured body, and then to lower light guide fibers 77 with plug element 76 onto the surface of the microstructured body.

With this arrangement in particular, it is possible to achieve an accurate optical coupling of light guide fibers 77 to rectangular depressions 65. In another processing step, the microstructured body can be coated with a polymer adhesive which fills at least rectangular depressions 65 and thus forms a waveguide in each, so proper coupling is possible between light guide fibers 77 and the resulting waveguides. As an alternative or simultaneously with light guide fibers 77, electric contact elements may also be provided in plug element 76 to make contact with suitable contacts, e.g., of an integrally cast electrical, optical or electro-optical component, in particular a thermal actuator, that is accurately positioned with respect to the outside contour of the integrated optical cover component, when plugged onto the microstructured body. The direction of plugging may also be varied.

Alternative shapes which produce a microstructured body with a different functionality are also conceivable and possible for the bottom mold plate as well as insert element 60. Further processing of the microstructred body to form an integrated optical component is possible here but is not obligatory.

Figure 11:
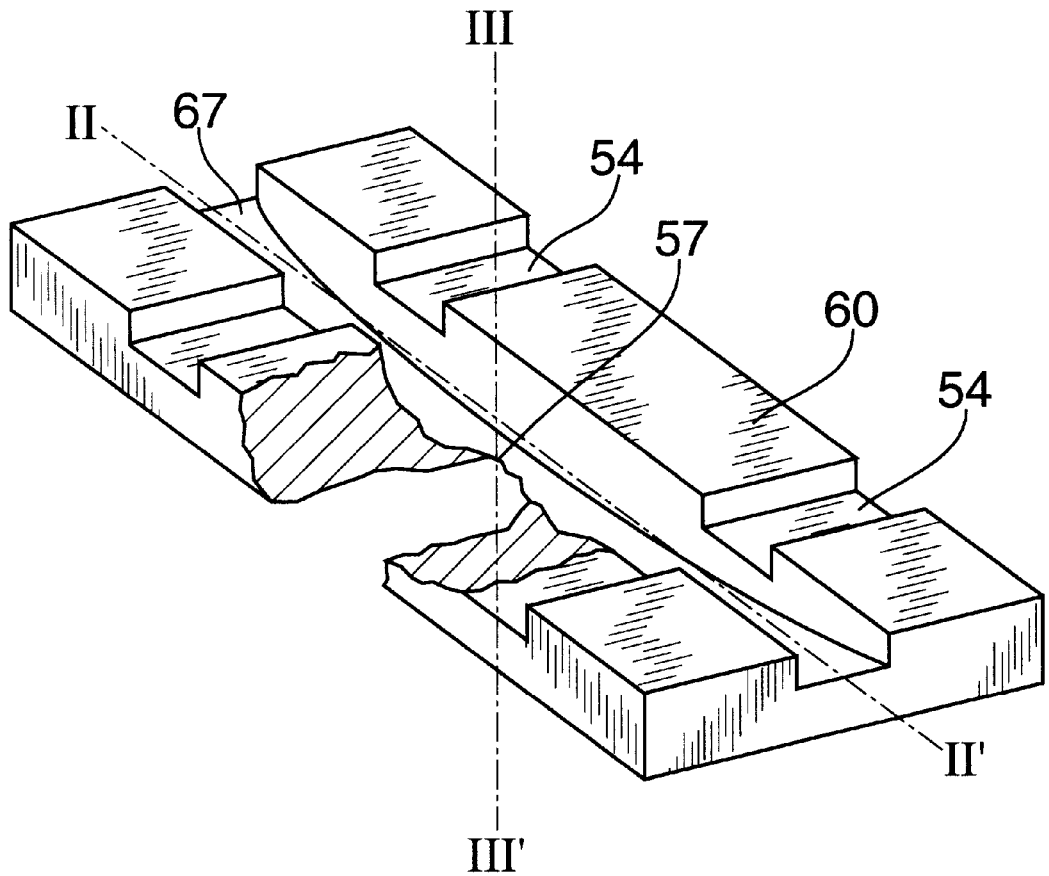
FIG. 11 illustrates a perspective view of an insert element for producing a tapered optical polarizer.

FIG. 11 shows another embodiment for insert element 60. To simplify the diagram, a part of the insert element has been cut away. Insert element 60 provided here is symmetrical with regard to a plane that includes lines AA' and CC'. The rectangular base body of insert element 60 has been provided with two transverse notches 54 that run approximately parallel to its shorter side. However, longitudinal notch 67 is not rectangular in this example. Instead, its cross section projected onto the plane of symmetry resembles a parabola. The depth of the notch is such that it comes in contact with the base surface of insert element 60, and its cross section projected onto a plane normal to BB' is rectangular.

With this insert element 60, it is possible with otherwise the same arrangement as illustrated in FIGS. 4a and b to produce another casting frame 20 where support element 80 also has a variable thickness profile according to the shape of longitudinal notch 67.

Figure 12:
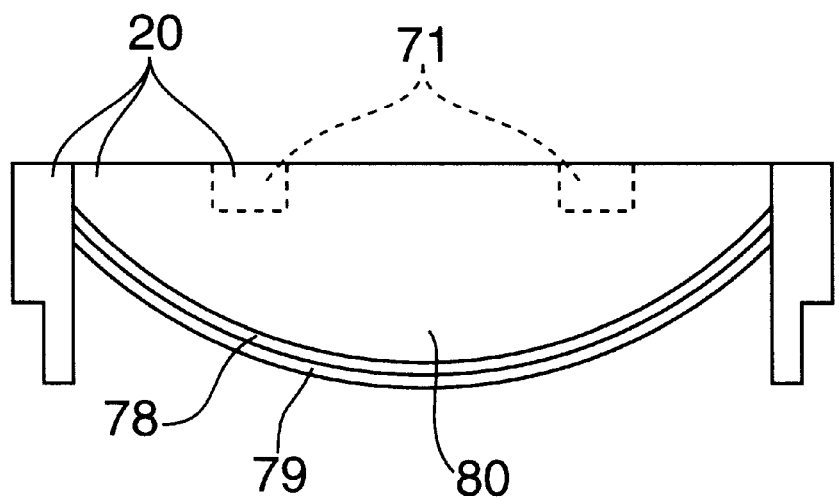
FIG. 12 illustrates a cut-away side view of a casting frame with a support element with a variable thickness profile.

Casting frame 20 formed with insert element 60 from FIG. 11 is shown in a cross section along the plane of symmetry in FIG. 12. Two transverse struts 71 (not visible in the diagram selected for FIG. 12, indicated only with dashed lines) are again formed at those locations where there were transverse notches 54. Support element 80 forms a web running approximately perpendicular to transverse struts 71 and having its greatest thickness in the middle of casting frame 20.

After unmolding, first a metal layer 78 and then a dielectric layer 79 are applied to support element 80. The thickness of each has been exaggerated in FIG. 12. These two layers 78, 79 together form an optical component in the form of a tapered polarizer 87 according to the position of the microstructured body. The following production of the microstructured body with this casting frame 20 yields an arrangement where the two layers 78, 79 are guided continuously toward and away from the bottom side of the microstructured body. If there is an optical waveguide there, the microstructured body with tapered element 87 functions as an optical polarizer by producing weaker attenuation of light whose electric polarization vector is parallel to the metal layer than light with polarization perpendicular to it. Dielectric layer 79 serves to adjust this effect, because excessive proximity of metal layer 78 to the optical waveguide would result in excessive attenuation even of the type of polarization to be allowed to pass through. To produce the microstructured body with an optical polarizer, a casting frame 20 according to FIG. 12 is placed on a second bottom mold plate that resembles the second bottom mold plate 93 from FIG. 6 and has at least one rectangular elevation 63 with a main arm, thus forming a casting mold. A microstructured body 100 is then produced as described above. Then a waveguide that is coupled directly to tapered integrated optical element 87 is formed by filling the waveguide groove with an optically transparent polymer adhesive that has a higher refractive index.

What is claimed is:

1. A method for producing a microstructured body, comprising the steps of:

providing a first casting mold;

inserting an insert element into the first casting mold;

filling the first casting mold at least partially with a curable fluid casting frame compound;

curing the curable fluid casting frame compound in order to provide a casting frame having at least one support element formed by the insert element and adapted to receive at least one of an electrical component, an optical component, and an electro-optical component;

arranging one of the electrical component, the optical component, and the electro-optical component at the support element;

providing a second bottom mold plate;

placing the casting frame on the second bottom mold plate in order to form a second casting mold;

filling the second casting mold at least partially with a fluid reaction molding compound; and curing the fluid reaction molding compound in order to obtain the microstructured body, wherein the casting frame is an integral part of the microstructured body.

2. The method according to claim 1, wherein heat applied over a large area from a bottom side is used to cure the reaction molding compound.

3. The method according to claim 1, further comprising the step of:
   placing the second bottom mold plate on a support plate prior to attaching the casting frame to the second bottom mold plate; wherein the second bottom mold plate is composed of a ferromagnetic material and is held in place by a magnetic field.

4. The method according to claim 1, wherein the second bottom mold plate includes at least one elevation in a depression, the at least one elevation leaving a corresponding depression in an integrated optical component when recast with the reaction molding compound.

5. The method according to claim 1, wherein the casting frame includes at least one inverted roof ridge-shaped support structure;
   wherein the second bottom mold plate includes at least one roof ridge-shaped frame adjusting elevation; and
   wherein the at least one inverted roof ridge-shaped support structure and the at least one roof ridge-shaped frame adjusting elevation are used to laterally and vertically adjust a positioning of the casting frame on the second bottom mold plate.

6. The method according to claim 1, further comprising the step of passing an electric current through the at least one component, the electric current heating the component and curing the reaction molding compound.

7. A microstructured body, comprising:
   a casting frame formed from a curable fluid casting compound, the casting frame including a support element connected integrally with the casting frame via struts and provided with at least one of an electrical component, an optical component, and an electro-optical component, wherein:
   the casting frame is at least partially filled with a reaction molding compound, and
   the casting frame is bonded to the reaction molding compound after the reaction molding compound is cured in accordance with a reaction.

8. The microstructured body according to claim 7, wherein the reaction molding compound is solidified, and the solidified reaction molding compound includes at least one depression.

9. The microstructured body according to claim 8, wherein the at least one depression is filled with a filling compound and serves as a waveguide.

* * * * *

UNITED STATES PATENT AND TRADEMARK OFFICE
CERTIFICATE OF CORRECTION

PATENT NO. : 6,027,671
DATED : February 22, 2000
INVENTOR(S) : Hans Kragl

Page 1 of 1

It is certified that error appears in the above-identified patent and that said Letters Patent is hereby corrected as shown below:

Column 5,
Line 51, after "above." --FIGS....... (new PARAGRAPH) --;

Column 7,
Line 35, change "AA' " to -- I - I'--;

Column 7,
Line 44, change "AA' " to -- I - I' --;

Column 11,
Line 50, after "frame" insert --20--;

Column 13,
Line 61, change "AA' " to --II - II'--

Column 13,
Line 61, change "CC' " to--III - III --

Signed and Sealed this

Twelfth Day of June, 2001

*Attest:*

NICHOLAS P. GODICI
*Attesting Officer*   *Acting Director of the United States Patent and Trademark Office*